(12) United States Patent
Ganzel et al.

(10) Patent No.: US 11,951,961 B2
(45) Date of Patent: Apr. 9, 2024

(54) METHOD FOR THE FUNCTIONAL TESTING OF A FLUID LEVEL WARNING INDICATOR

(71) Applicant: ZF Active Safety GmbH, Koblenz (DE)

(72) Inventors: Blaise Ganzel, Ann Arbor, MI (US); Andreas Marx, Hartenfels (DE); Daniel Noll, Andernach (DE)

(73) Assignees: ZF Active Safety US Inc., Livonia, MI (US); ZF Active Safety GmbH, Koblenz (DE)

( * ) Notice: Subject to any disclaimer, the term of this patent is extended or adjusted under 35 U.S.C. 154(b) by 946 days.

(21) Appl. No.: 16/543,658

(22) Filed: Aug. 19, 2019

(65) Prior Publication Data

US 2021/0053547 A1    Feb. 25, 2021

(51) Int. Cl.
| | |
|---|---|
| *B60T 17/22* | (2006.01) |
| *B60T 13/14* | (2006.01) |
| *B60T 13/68* | (2006.01) |
| *G01F 23/64* | (2006.01) |
| *G01F 23/74* | (2006.01) |
| *G01F 25/20* | (2022.01) |

(52) U.S. Cl.
CPC .......... *B60T 17/225* (2013.01); *B60T 13/145* (2013.01); *B60T 13/686* (2013.01); *G01F 23/64* (2013.01); *G01F 23/74* (2013.01); *G01F 25/20* (2022.01); *G01F 25/22* (2022.01)

(58) Field of Classification Search
CPC ...... B60T 17/22; B60T 17/221; B60T 17/225; B60T 13/145; B60T 13/68; B60T 13/686; G01F 25/20; G01F 25/11; G01F 23/64; G01F 23/74; G01F 25/22
See application file for complete search history.

(56) References Cited

U.S. PATENT DOCUMENTS

| | | | | |
|---|---|---|---|---|
| 530,592 | A | * 12/1894 | Kleritj | .................. G01F 23/74 |
| | | | | 73/317 |
| 2,744,177 | A | * 5/1956 | Barber | .................. G01F 23/70 |
| | | | | 335/207 |
| 3,555,221 | A | * 1/1971 | Booth | ................ H01H 35/405 |
| | | | | 200/81 R |

(Continued)

FOREIGN PATENT DOCUMENTS

| | | |
|---|---|---|
| DE | 102015210845 A1 * 12/2016 | |
| DE | 102017221478 A1 *  6/2019 | ............ B60T 13/146 |

(Continued)

*Primary Examiner* — Thomas J Williams
(74) *Attorney, Agent, or Firm* — Robert James Harwood

(57) ABSTRACT

A testing method includes the steps of: (1) providing a negative pressure generator; (2) generating a negative pressure in a fluid passageway and a chamber which are in fluid communication with a guiding section of a fluid reservoir wherein a second sensing element is affixed to a guiding section of the fluid reservoir; (3) transferring a fluid flow stream from the guiding section to the chamber via the fluid passageway and drawing a float having a first sensing element from an upper position to a lower position within the guiding section; (4) generating a signal via the first and second sensing elements as the float moves relative to the second sensing element within the guiding section; and (5) transmitting a signal to at least one of a control unit or a graphical user display.

19 Claims, 9 Drawing Sheets

(56) References Cited

U.S. PATENT DOCUMENTS

| | | | |
|---|---|---|---|
| 3,678,232 A * | 7/1972 | Hodges | B60T 17/225 340/450.1 |
| 3,691,522 A * | 9/1972 | Hocking | F16D 66/025 340/450.1 |
| 3,714,823 A * | 2/1973 | Wilkens | G01F 9/008 73/221 |
| 3,750,124 A * | 7/1973 | Barnes | B60T 17/225 200/84 C |
| 3,896,281 A * | 7/1975 | Feoktistov | H01H 36/02 335/207 |
| 4,090,050 A * | 5/1978 | Siiberg | H01H 36/02 340/623 |
| 4,761,042 A * | 8/1988 | Seibert | B60T 8/446 303/122.1 |
| 4,805,668 A * | 2/1989 | Genter | B60T 11/26 137/558 |
| 5,046,313 A * | 9/1991 | Crumb | B60T 17/226 340/459 |
| 5,142,865 A * | 9/1992 | Sakakihara | B60T 13/143 60/555 |
| 5,150,614 A | 9/1992 | Manfred | |
| 7,448,211 B2 * | 11/2008 | Hayashi | B60T 11/26 60/534 |
| 10,814,855 B1 * | 10/2020 | Ganzel | F16K 33/00 |
| 2003/0183002 A1 * | 10/2003 | Burger | G01F 23/76 340/623 |
| 2012/0038209 A1 | 2/2012 | Yamamoto | |
| 2012/0292982 A1 * | 11/2012 | Takahashi | B60T 17/225 303/6.01 |
| 2016/0311422 A1 * | 10/2016 | Van Zanten | G01M 3/2869 |
| 2017/0015290 A1 * | 1/2017 | Oosawa | B60T 13/146 |
| 2021/0053547 A1 * | 2/2021 | Ganzel | G01F 25/20 |
| 2021/0179043 A1 * | 6/2021 | Walter | B60T 13/686 |
| 2021/0387608 A1 * | 12/2021 | Haag | G01F 23/0007 |

FOREIGN PATENT DOCUMENTS

| | | | |
|---|---|---|---|
| EP | 1348938 A2 * | 10/2003 | G01F 23/74 |
| WO | 2019105628 A1 | 6/2019 | |
| WO | 2019105748 A1 | 6/2019 | |
| WO | 2019115139 A1 | 6/2019 | |

* cited by examiner

METHOD FOR THE FUNCTIONAL TESTING OF A FLUID LEVEL WARNING INDICATOR

TECHNICAL FIELD

The present disclosure relates to a method for the functional testing of a fluid level warning indicator.

BACKGROUND

Conventionally, among vehicles such as automobiles, there are vehicles that employ hydraulic brake systems and hydraulic clutch systems utilizing hydraulic pressure. In the hydraulic brake systems and hydraulic clutch systems, a master cylinder that generates hydraulic pressure and a reservoir tank that stores hydraulic fluid supplied to the master cylinder are used.

In order for the master cylinder to generate hydraulic pressure at times when hydraulic pressure is needed, it is necessary for a predetermined fluid volume of the hydraulic fluid to be stored inside the reservoir tank. During normal base brake situation (standard braking without individual wheel pressure control), the reservoir fluid volume will not be used. Only in the case of wheel individual pressure control, as usual in ABS, TC, YSC, and others, the reservoir volume reserve will be used. Fluid from the reservoir could also be used under a fade brake condition due to an increased fluid demand in the brake calipers. Additional fluid volume may be taken from the reservoir if a leak has drained at least parts of the brake system. For this reason, usually a fluid volume detection sensor is disposed in the reservoir tank, and when the fluid volume inside the reservoir tank falls below the predetermined fluid volume, the fluid volume detection sensor detects this and displays it on a fluid volume indicator. Because of the display of the fluid volume indicator, the reservoir tank may be replenished with hydraulic fluid by a user so that it is ensured that the fluid volume inside the reservoir tank is equal to or greater than a predetermined fluid volume.

SUMMARY

The present disclosure provides for a method for testing a fluid level indicator within a reservoir comprising the steps of: (1) providing a plunger in a first retracted position (rest position) within a plunger chamber; (2) moving the plunger from the first retracted position (rest position) to a second extended position to exhaust the fluid from the plunger chamber into a fluid reservoir; (3) retracting the plunger from the second extended position towards the first retracted position thereby generating a negative pressure in a fluid passageway which connects the third chamber of the reservoir to the plunger chamber so that a fluid volume stream moves out of the third chamber which pulls the float from an upper position to a lower position within the guiding section; and (4) generating a signal via the first and second sensing elements as the float moves within the guiding section of the third chamber from a higher position to a lower position or a critically lower position (towards the first side of the reservoir which may be connected to the passageway) and transmitting a signal to at least one of a control unit or a graphical user display.

In yet another embodiment, a method includes the steps of: (1) providing a negative pressure generator (such as, but not limited to a pump); (2) generating a negative pressure in a fluid passageway and a chamber which are in fluid communication with a guiding section of a fluid reservoir wherein a second sensing element is affixed to a guiding section of the fluid reservoir; (3) transferring a fluid flow stream from the guiding section to the chamber via the fluid passageway and drawing a float (having a first sensing element) from an upper position to a lower position within the guiding section; and (4) generating a signal via the first and second sensing elements as the float moves relative to the second sensing element within the guiding section and transmitting a signal to at least one of a control unit or a graphical user display.

In the various embodiments of the present disclosure, the third chamber of the reservoir is formed by a main section and a guiding section which is in fluid communication with the main section. Moreover, the float may have a first sensing element disposed within the housing of the float. The float may have limited movement within the third chamber of the reservoir and the second sensing element may be affixed to an interior (or exterior) of the reservoir. The upward movement of the float within the guiding section may be limited by a projection which extends into the guiding section of the third chamber. The aforementioned control unit may further be in electrical communication with a graphical user interface to display a status message. Magnets are just a non-limiting example for the first and second sensing elements.

A third embodiment test method of the present disclosure may include the following steps: (1) the electro-motor plunger is provided in a first retracted position within an integrated brake controller having the solenoid valves wherein the first plurality of solenoid valves are simultaneously switched into a closed position while a second plurality of solenoid valves are also switched to an open position to create a first open flow path from the electro-motor plunger chamber to the fluid reservoir; (2) Then, the plunger moves from the first retracted position to a second extended position exhausting fluid from the plunger chamber into the reservoir via the first open flow path; (3) The fluid passageway fluidly couples the guiding section of the reservoir to the plunger chamber, and accordingly, when the electro-motor plunger moves from the second extended position back towards the first retracted position, this movement generates a negative pressure in the fluid passageway and plunger chamber so that a fluid stream flows from (the guide section of) the fluid reservoir into the plunger chamber via the fluid passageway. (4) The fluid stream draws the float (having a first sensing element) down within the guide section of the third chamber toward the fluid passageway; (5) The second sensing element affixed to the reservoir detects the relative movement of the first sensing element as the float (and first sensing element) move from an upper position to a lower position via the fluid stream; (6) the first and second sensing elements may generate a signal which is transmitted back to the control unit so as to provide a notification that the expected change (increase or decrease) in the fluid level within the reservoir was achieved. It is understood that a second signal may be transmitted from the control unit to a graphical user interface to alert a user. Via the aforementioned test method steps, the movement of the float (associated with the changing fluid level within the reservoir) and the sensing system can be tested to confirm that the brake fluid system is working properly. Preferably this testing will be done after the ignition switch of the vehicle is in an off-position.

BRIEF DESCRIPTION OF THE DRAWINGS

Hereinafter the present disclosure shall be illustrated in detail by way of an embodiment and with reference to the enclosed drawings, wherein.

Like reference numerals refer to like parts throughout the description of several views of the drawings.

DETAILED DESCRIPTION

Figure 1:
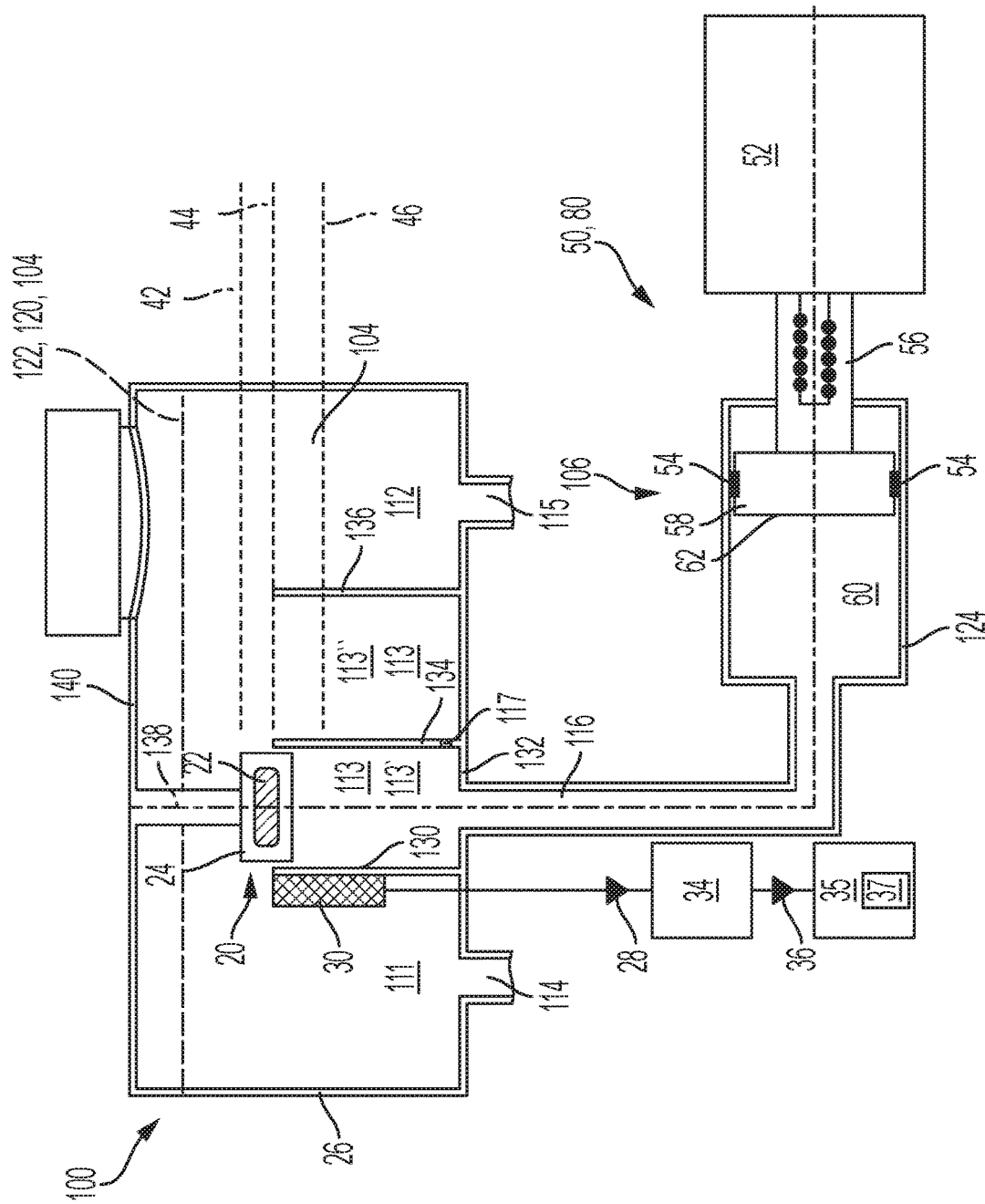
FIG. 1 illustrates a first testing arrangement using an electro-motoric plunger in a first or preparing position.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

The fluid reservoir 100 of the invention includes a first chamber 111, a second chamber 112, and a third chamber 113 optionally disposed between the first chamber 111 and the second chamber 112. As shown in FIG. 1, a first interior wall 130 extends away from a first side 132 of the fluid reservoir 100 such that the first interior wall 130 is disposed between at least a portion of the first chamber 111 and the third chamber 113. The third chamber 113 includes a guiding section 113' and a main section 113". A second interior wall 134 also extends from the first side 132 of the fluid reservoir 100 such that the second interior wall 134 is disposed between at least a portion of the second chamber 112 and at least a portion of the third chamber 113. Similarly, a third interior wall 136 extends from the first side 132 of the fluid reservoir 100 such that the third interior wall 136 is disposed within the third chamber 113. The third interior wall 136 and the first interior wall 130 define (the sides of) the guiding section 113' within the third chamber 113.

With respect to the third chamber 113, the guiding section 113' and the main section 113" of the third chamber 113 are in fluid communication with each other via opening 117 defined in the third interior wall 136. As shown, the first interior wall 130 and the third interior wall 136 are configured to guide the movement of the float 20 as a fluid level 122 changes. As shown in FIG. 1, the float 20 abuts projection 138 and is disposed below a fluid surface 120 which defines a fluid level 122. If the fluid level 122 sinks due to a decrease of fluid in the fluid reservoir 100, then the float 20 moves accordingly with the fluid surface 120 and fluid level 122.

The float 20 includes a float housing 24 which contains a first sensing element 22 i.e. a permanent magnet 22 which moves synchronously with the float 20. A second sensing element 30 may be attached to the first interior wall (or a portion of the reservoir housing 26). A non-limiting example of the second sensing element 30 may be a 3D hall-sensor 30 or/and a reed switch 30 in order to sense the actual position [3D hall-sensor] or the movement of the first sensing element 22 past a defined position [ex: position/location of the reed switch or second sensing element 30] by detecting the movement of the first sensing element 22 (disposed within the moving float 20) within guiding section 113' of third chamber 113. As shown in FIG. 1, the fluid reservoir 100 further includes two separate hydraulic output paths 114, 115 which are connected to a two-chamber or tandem master cylinder (not shown) which generates brake pressure in separate brake circuits.

Figure 2:
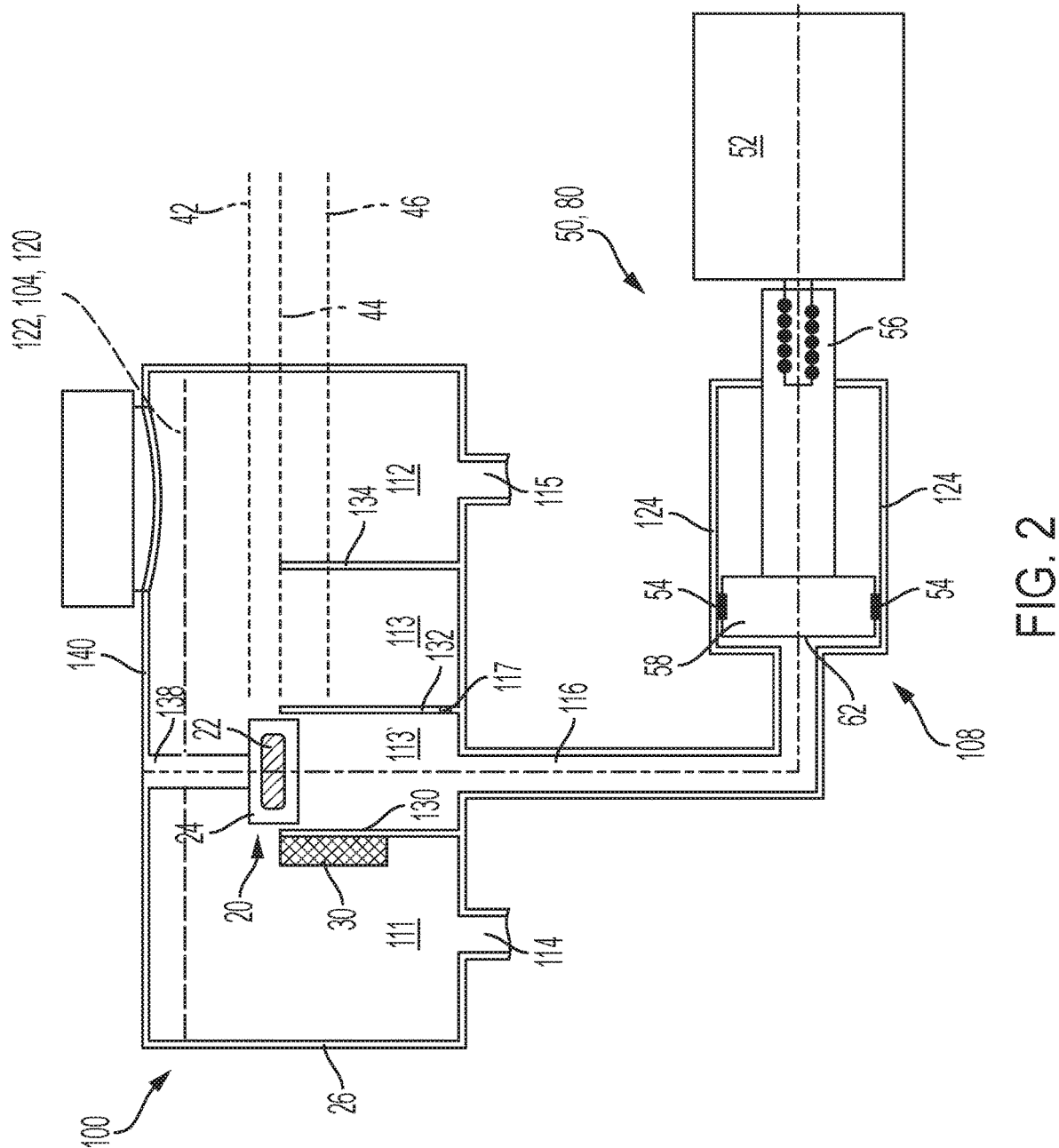
FIG. 2 illustrates a first testing arrangement using an electro-motoric plunger in a second or starting position.
Figure 3:
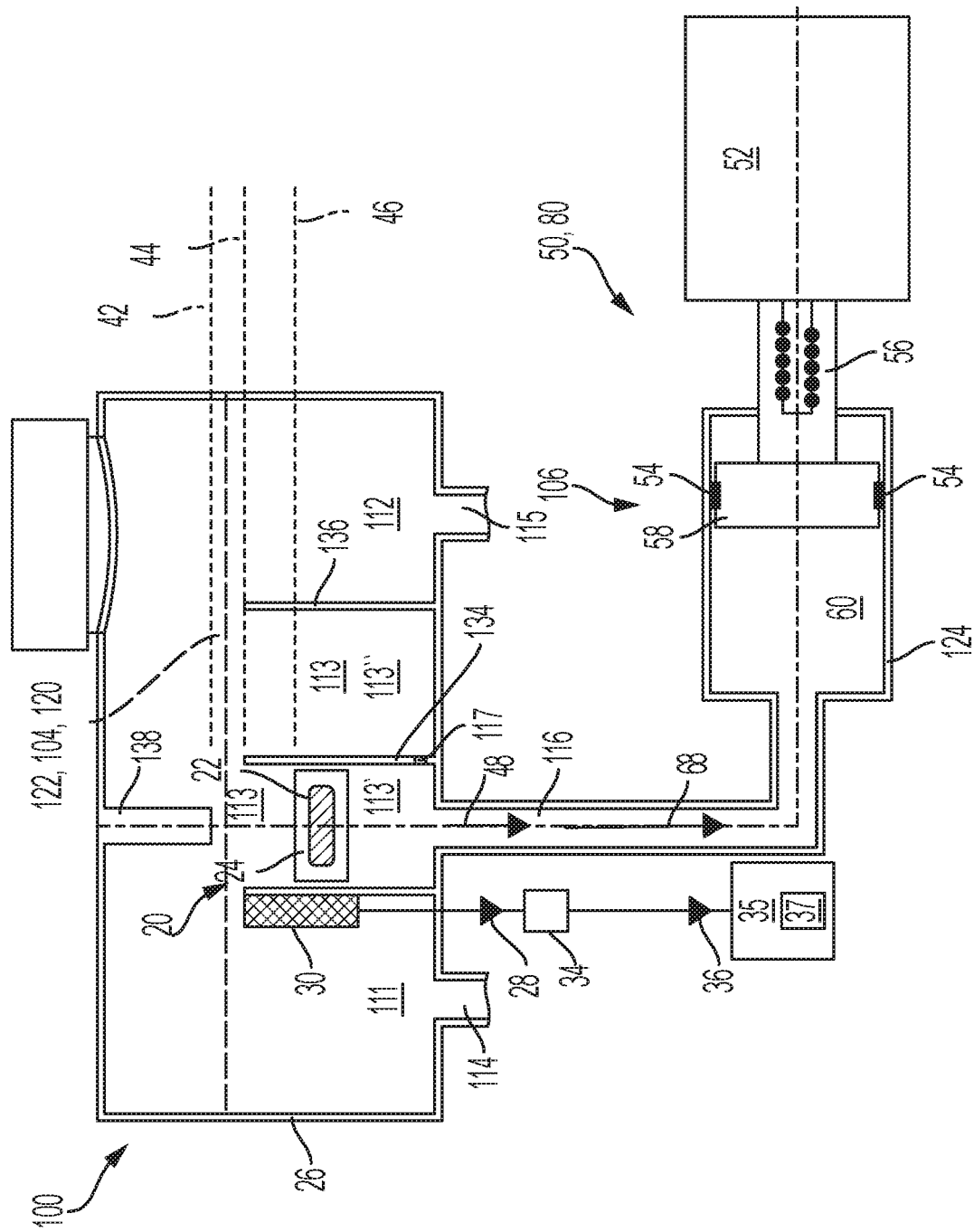
FIG. 3 illustrates first testing arrangement using an electro-motoric plunger in a third or absorbing position.

A first testing arrangement is shown in FIGS. 1-3 where the guiding section 113' of the fluid reservoir 100 which guides the float 20 contains a fluid on wherein the float 20 moves with the fluid surface 120 or fluid level 122. The guiding section 113' of the third chamber 113 may be in fluid communication with an electro-motoric driven plunger arrangement 50 via fluid passageway 116 (affixed to the first side 132 of the fluid reservoir housing 110 in FIG. 1). The plunger chamber 60 of the electro-motor driven plunger arrangement 50 is configured to hold fluid 104 which has been evacuated from the fluid reservoir 100 when the plunger arrangement 50 is retracted—as later described. In the non-limiting example of FIG. 1, a spindle drive 320 is driven by motor 52 to move the plunger 58 within the plunger chamber 60. FIG. 1 illustrates the plunger 58 in a first retracted position 106.

Accordingly, using the aforementioned system, the test procedure may be provided in the following steps: (1) providing a plunger 58 in a first retracted position (rest position) 106 within a plunger chamber 60 as shown in FIG. 1; (2) moving the plunger from the first retracted position (rest position) 106 to a second extended position 108 to exhaust the fluid from the plunger chamber 60 into a fluid reservoir 100; (3) retracting the plunger 58 from the second extended position 108 towards the first retracted position 106 thereby generating a negative pressure 48 in a fluid passageway 116 which connects the third chamber 113 of the reservoir 100 to the plunger chamber 60 so that a fluid volume stream 68 moves out of the guiding section 113' of the third chamber 113 thereby pulling the float 20 (together with the negative pressure 48) from an upper position 42 to a lower position 44 (or critically low position 46) within the guiding section 113'; and (4) generating a signal 28 via the first and second sensing elements 22, 30 as the float 20 moves within the guiding section 113' of the third chamber 113 from an upper position 42 to a lower position 44 or a critically lower position 46 (towards the first side 132 of the reservoir 100 which may be connected to the passageway 116) and transmitting a second signal 36 to at least one of a control unit 34 or a graphical user display 35.

As shown in the various figures, the float 20 (having first sensing element 22) moves relative to the second sensing element 30 when a fluid flow stream 68 is generated by a negative pressure 48. Accordingly, the relative movement of the float 20 (as it passes the second sensing element 30) thereby generates a signal 28 (see FIG. 3) back to the control unit 34. The control unit 34 may also be in communication with a graphical user interface 35 via a second signal 36 to display a status message 37 to a user. As shown, a fluid flow stream 68 is generated from the guide section 113' of the fluid reservoir to the plunger chamber 60 via fluid passageway 116, the float 20 having the first sensing element 22 moves relative to the second sensing element 30 (fixed to the first interior wall 130 and/or portion of the reservoir housing 26) and therefore, the first and second sensing elements 22, 30 detects a condition upon which fluid 104 is being withdrawn from the reservoir 100 at fluid passageway 116. The aforementioned steps define a first embodiment test method which may, but not necessarily, be performed after the ignition switch of the vehicle is in an off-position. When the expected signals are displayed when performing the above-referenced steps, it is understood that the fluid level indicator system is working properly.

As previously noted, with respect to the various embodiments of the present disclosure, the float 20 may vary position between an upper position 42 (FIG. 1), a lower position 44 (FIG. 8), and a critically low position 46 (see FIG. 3). As shown in the aforementioned figures, the float 20 may remain below the fluid surface 120 regardless of the fluid level 122. When the system has a maximum fluid level 122' (FIG. 1), the float 20 may abut a projection 138 (see FIGS. 1-2 and 4-7) which may extend from the second side 140 of the fluid reservoir 100 so that the float 20 stays submerged within the fluid 104 (and within the guiding section of the third chamber) despite oscillations or movement of the reservoir while the vehicle is in motion. Moreover, as shown in the various embodiments of the present disclosure, a seal 54 may be disposed on the plunger 58 to keep fluid 104 (if any in the plunger chamber 60) disposed only on the first side 62 of the plunger 58. While the second sensing element 30 is shown in the non-limiting example figures as being disposed within the fluid reservoir 100, it is understood that the second sensing element 30 may be externally fixed to the fluid reservoir 100. Moreover, the test method of the various embodiments of the present disclosure is independent of the number of the feed ports 114, 115, 116 and/or chambers 111, 112, 113 inside of the fluid reservoir 100.

Accordingly, with reference back to FIGS. 1-3, a method of the present disclosure may include the steps of: (1) Providing a negative pressure generator 80 (such as, but not limited to a pump (not shown) or a plunger/chamber arrangement 50); (2) Generating a negative pressure 48 in a fluid passageway 116 and a chamber 60 which are in fluid communication with a guiding section 113' of a fluid reservoir 100 wherein a second sensing element 30 is affixed to a guiding section 113' of the fluid reservoir 100. It is understood that chamber 60 is shown as a plunger chamber in FIGS. 1-3, but chamber 60 may also be another other kind of chamber such as, but not limited to, a chamber within a pump (not shown). (3) Transferring a fluid flow stream 68 (FIG. 3) from the guiding section 113' of the reservoir 100 to the chamber 60 via the fluid passageway 116 and drawing a float 20 (having a first sensing element 22) from an upper position 42 to a lower position 44, 46 within the guiding section 113'; and (4) Generating a signal 28 via the first and second sensing elements 22, 30 as the float 20 (and first sensing element 22) moves relative to the second sensing element 30 within the guiding section 113' and transmitting the signal 28 to at least one of a control unit 34 or a graphical user display 35.

Figure 4:
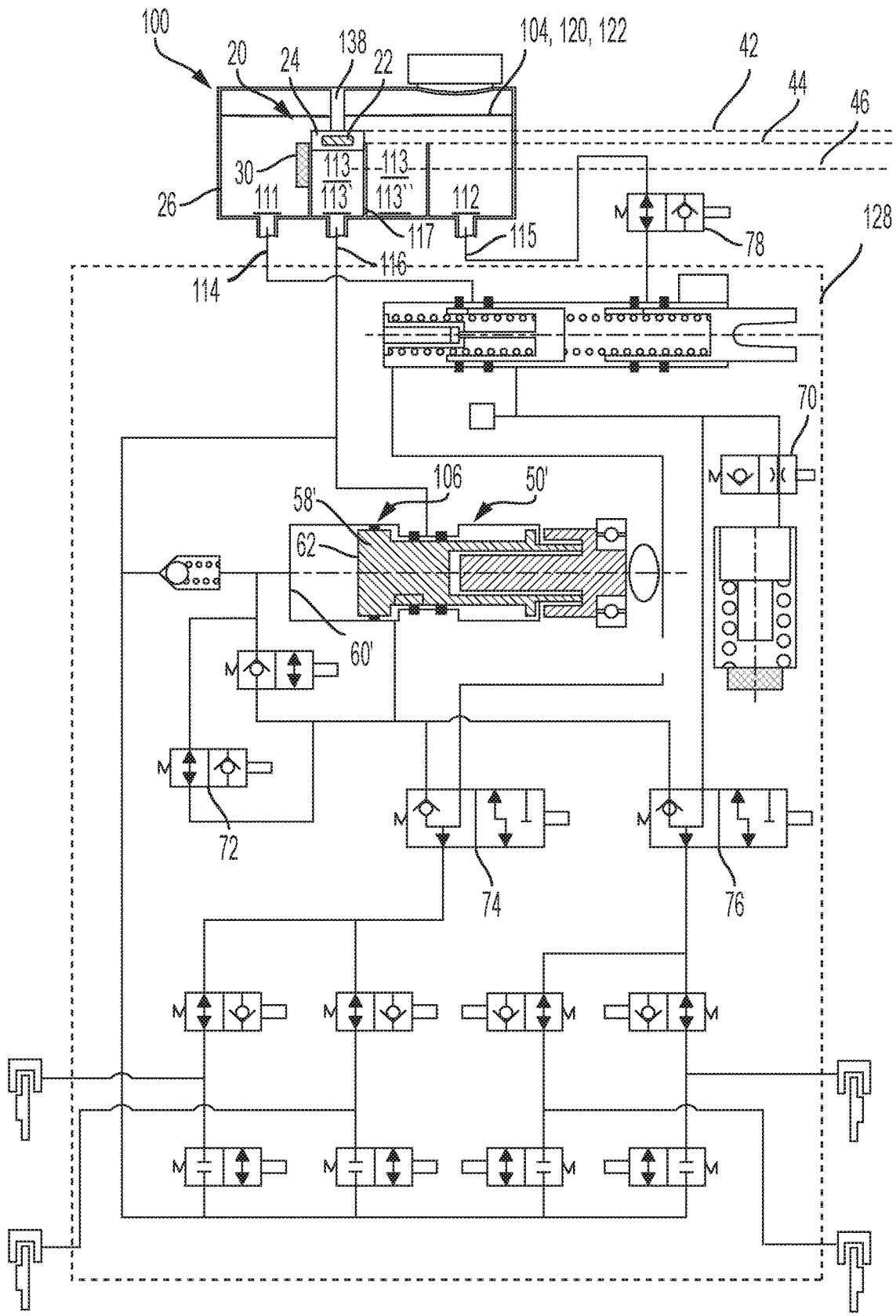
FIG. 4 illustrates a second testing arrangement using a hydraulic brake pressure generator.
Figure 5:
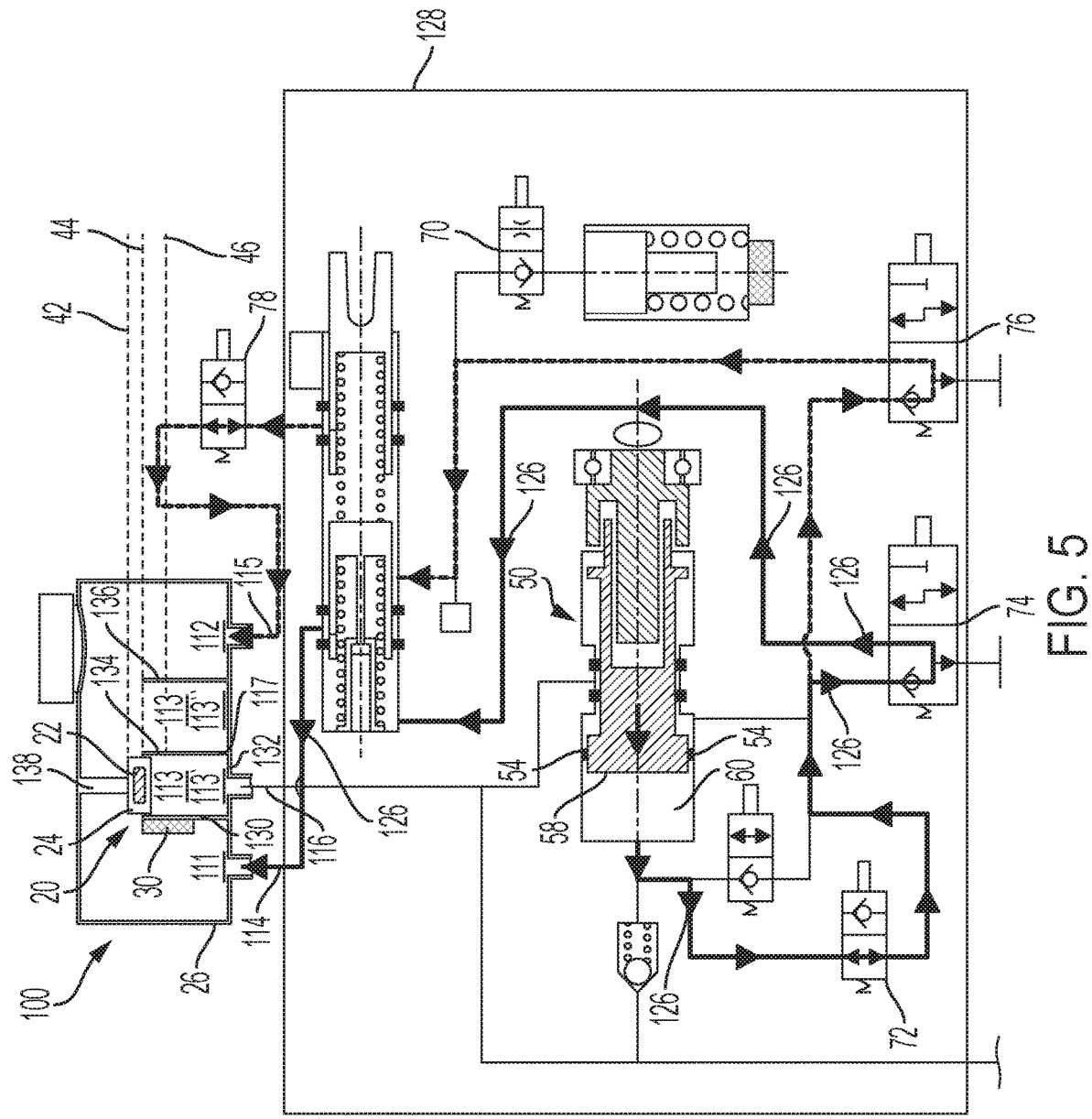
FIG. 5 illustrates a second testing arrangement using a hydraulic brake pressure generator in a first or preparing position.
Figure 6:
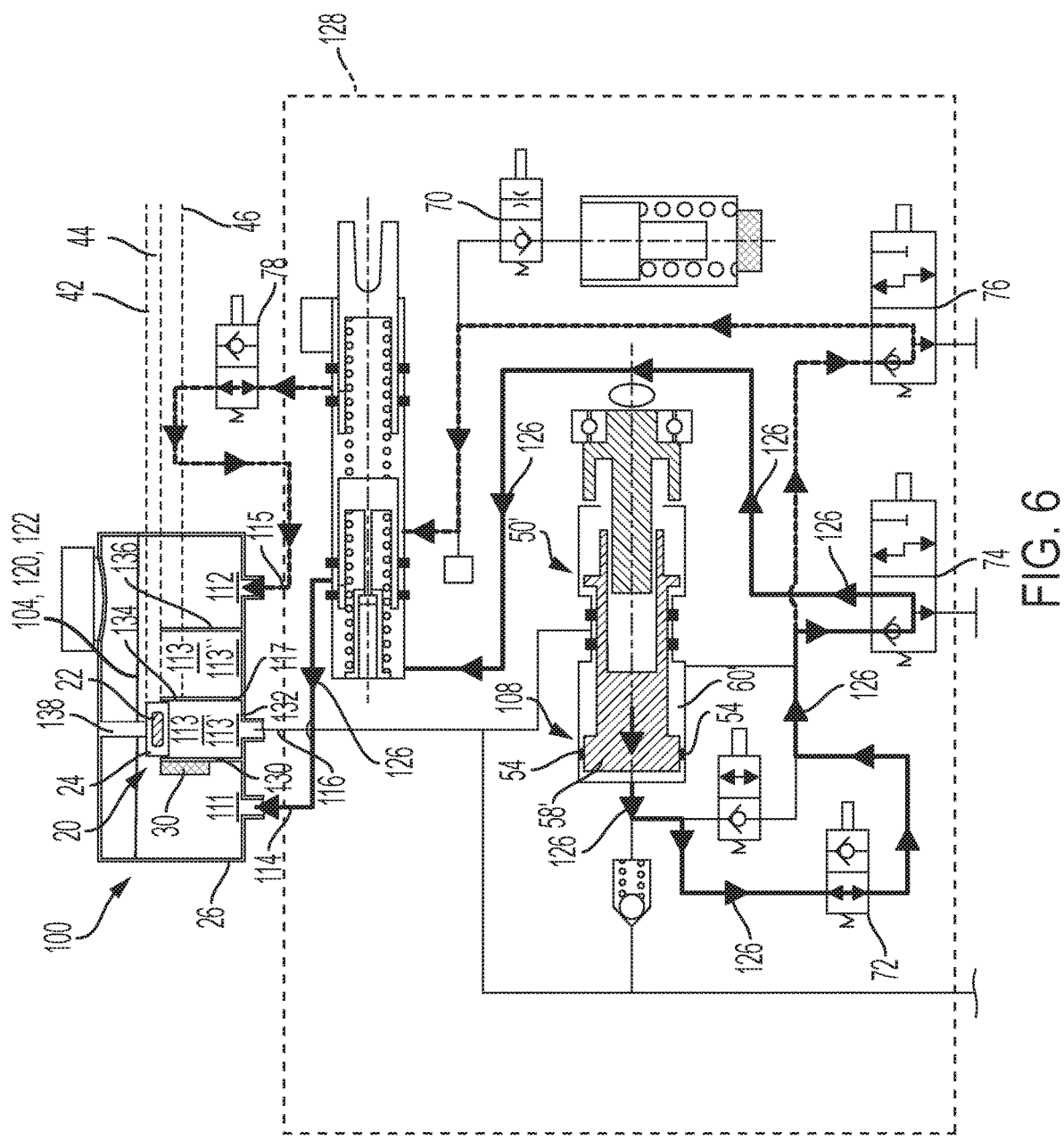
FIG. 6 illustrates a second testing arrangement using a hydraulic brake pressure generator in a second or starting position.

Referring now to FIGS. 4-9, another testing arrangement 140 is shown using an integrated brake controller 128. This testing arrangement 140 also includes a fluid reservoir 100 wherein the guide section 113' of the third chamber 113 guides the movement of the float 20 between an upper position 42 (FIG. 1), a lower position (FIG. 8) and a critically low position (FIG. 3). Similar to the first embodiment in FIGS. 1-3, the guide section 113' in the second embodiment may also contain fluid 104 wherein the float 20 remains disposed below the fluid surface 120. As shown in FIG. 4, the guide section 113' of the third chamber 113 is in fluid communication with an electrohydraulic pressure generator (Integrated Brake Controller—IBC) 128 via fluid passageway 116. The electrohydraulic pressure generator 128 may further include an electro-motoric driven plunger and plunger chamber arrangement (or plunger arrangement) 50' which normally generates the requested brake pressure. The aforementioned plunger and chamber arrangement 50' includes a plunger 58' and a chamber 60' of FIG. 4. The plunger and chamber arrangement 50' of the electrohydraulic pressure generator 128 may also be configured to take in fluid 104 which has been transferred from the fluid reservoir 100 to the plunger chamber 60' when the movement of plunger 58' generates a negative pressure 48 (FIG. 4) in the plunger chamber 60 and the fluid passageway 116. As shown in FIG. 4, a plurality of solenoid valves 70, 72, 74, 76, 78 may each be switched between an open position and a closed position (as described later in this disclosure) to enable the transfer of fluid 104 from the fluid reservoir 100 to the plunger chamber 60' via the fluid passageway 116.

Figure 7:
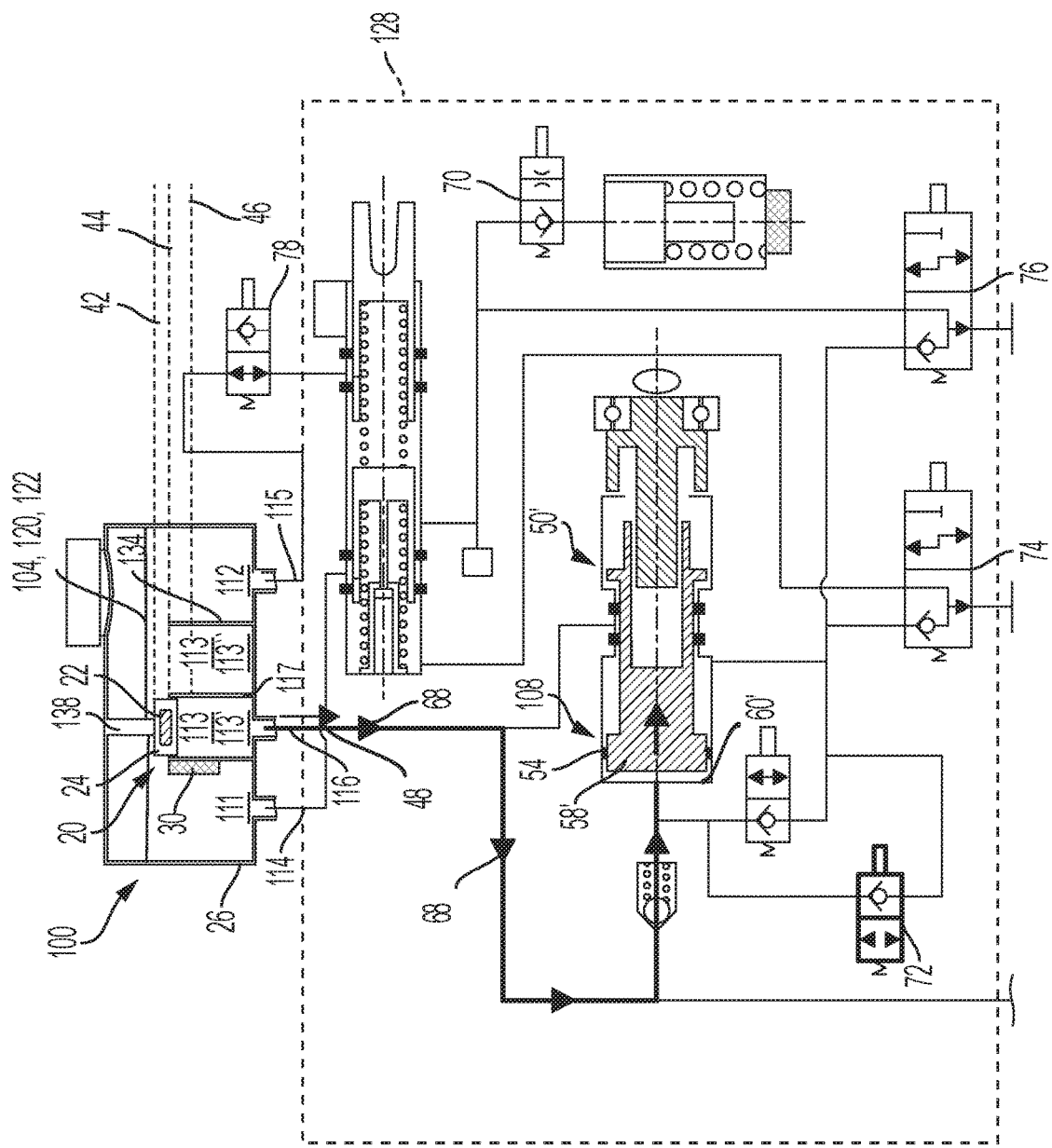
FIG. 7 illustrates a second testing arrangement using a hydraulic brake pressure generator in a third or absorbing starting position.
Figure 8:
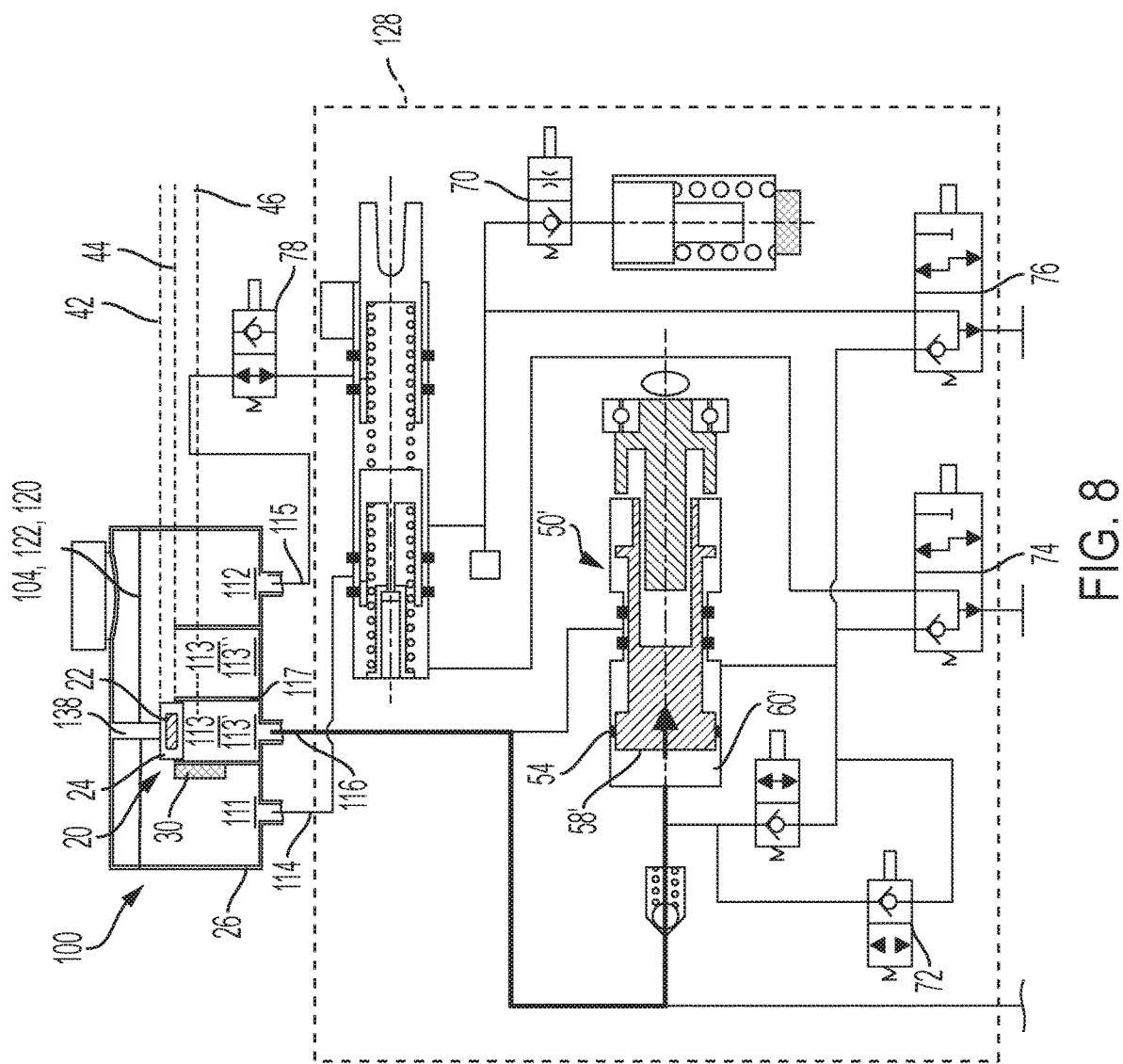
FIG. 8 illustrates a second testing arrangement using a hydraulic brake pressure generator in a further absorbing position driving the float into a first testing position.
Figure 9:
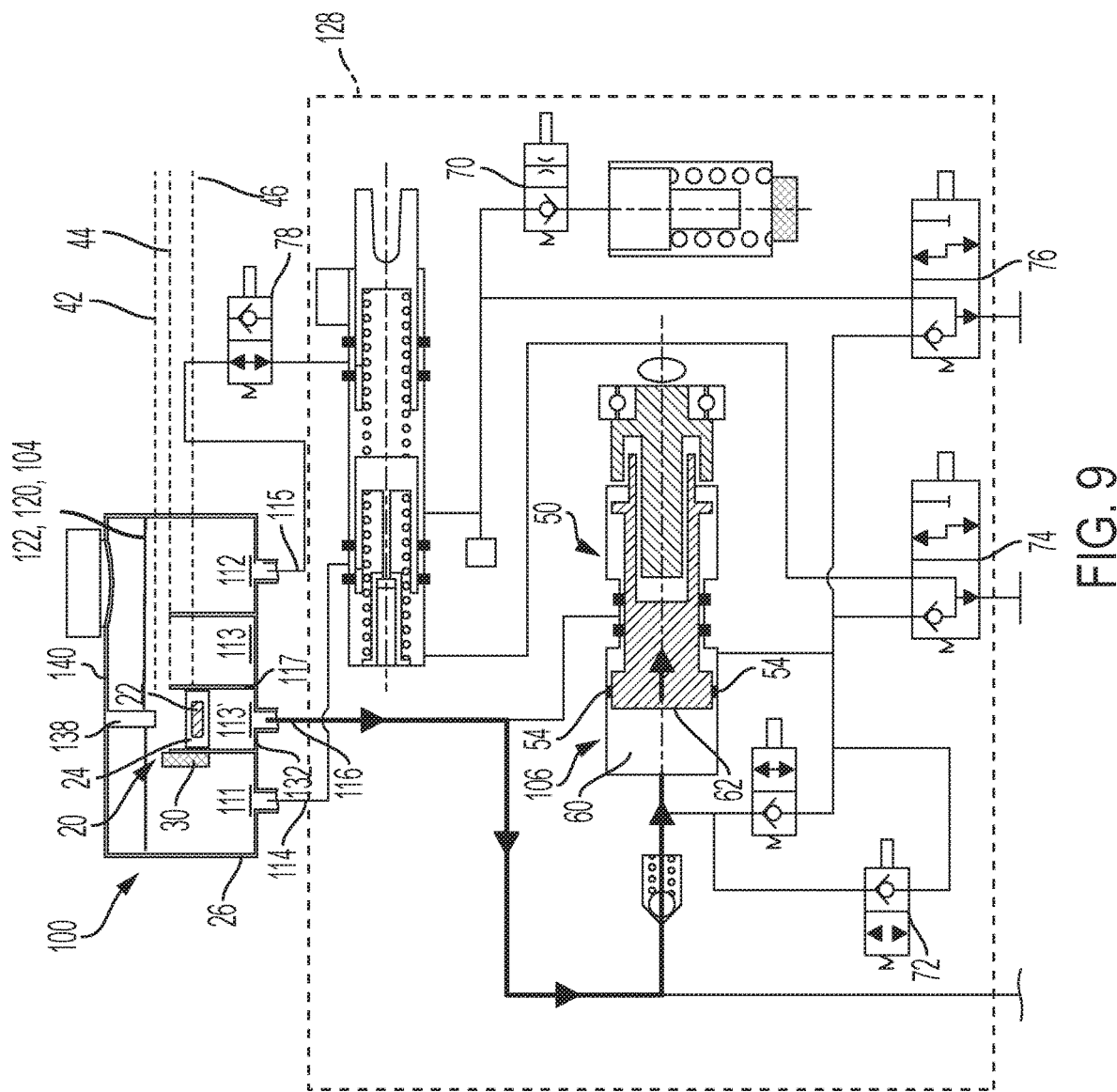
FIG. 9 illustrates a second testing arrangement using a hydraulic brake pressure generator in a further absorbing position driving the float into a second testing position.

The third embodiment test method of the present disclosure may include the following steps: (1) the electro-motoric plunger 58' is provided in a first retracted position 106 (shown in FIG. 5) within an integrated brake controller and a first plurality of solenoid valves 70, 74, 76 (within the integrated brake controller) are simultaneously switched into a closed position while a second plurality of solenoid valves 72, 78 are also switched to an open position to create a first open flow path 126 (FIG. 5) from plunger chamber 60' to the fluid reservoir 100; (2) Then, the plunger 58' moves from the first retracted position 106 (shown in FIG. 5) to a second extended position 108 (shown in FIG. 6) pushing fluid 104 from the chamber 60' into the reservoir 100 via the first open flow path 126 shown in FIG. 6; (3) As shown in FIG. 7, fluid passageway 116 fluidly couples the third chamber 113 of the reservoir to the plunger chamber 60, and accordingly, when the plunger 58' moves from the second extended position 108 (shown in FIG. 7) back towards the first retracted position 106 (shown in FIGS. 8-9), this movement generates a negative pressure 48 (see FIG. 7) in fluid passageway 116 and plunger chamber 60' so that fluid flows from (the guide section 113' of) the third chamber 113 of the fluid reservoir 100 into the plunger chamber 60' via fluid passageway 116. The negative pressure and the fluid flow 68 draw the float 20 (having the first sensing element 22) from an upper position 42 (FIG. 4) to a lower position 44 (FIG. 8) or a critically low position 46 (FIG. 9) within the guide section 113' of the reservoir 100.

Similar to the previously described example embodiments, the second sensing element 30 in the third embodiment detects the relative movement of the first sensing element 22 as the float 20 (and first sensing element 22) moves from the upper position 42 to the lower position 44 due to the negative pressure and fluid flow stream 68. Accordingly, the first and second sensing elements 22, 30 generate a signal 28 which is transmitted back to the control unit 34 so as to provide a notification that the expected pressure change occurred within the fluid reservoir 100. It is understood that a second signal 36 may be transmitted from the control unit 34 to a graphical user interface 35 to alert a user.

Via the aforementioned test method steps of the various embodiments of the present disclosure, the movement of the float 20 (associated with the negative pressure 48 and fluid flow stream 68 within the reservoir 100) and the sensing system 22, 30 can be tested to confirm that the brake fluid system is working properly. Preferably this testing will be done after the ignition switch of the vehicle is in an off-position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for testing a fluid level indicator within a reservoir comprising the steps of:
   providing a fluid reservoir having first, second and third chambers, the third chamber being formed by a main chamber and a guiding chamber in fluid communication with the main chamber;
   providing and maintaining a first sensing element in the guiding chamber;
   providing a plunger in a first retracted position within a plunger chamber;
   moving the plunger from the first retracted position to a second extended position to exhaust the fluid from the plunger chamber into the fluid reservoir;
   moving the plunger from the second extended position back towards the first retracted position thereby generating a negative pressure in a fluid passageway which connects the third chamber of the reservoir to the plunger chamber so a fluid flow stream is generated from the third chamber to the plunger chamber, the fluid flow stream directly drawing the first sensing element vertically downward within the guiding chamber toward the fluid passageway such that the first sensing element moves vertically downward in the guiding chamber relative to an upper surface of the fluid in the guiding chamber; and
   generating a signal via the first sensing element and a second sensing element as the first sensing element moves vertically relative to the second sensing element and transmitting the signal to at least one of a control unit or a graphical user display.

2. The testing method as defined in claim 1 wherein a vertical position of the first sensing element in the guiding chamber is independent of the upper surface of the fluid in the guiding chamber.

3. The testing method as defined in claim 1 wherein a float, which has the first sensing element, is disposed entirely below the upper surface of the fluid within the third chamber of the reservoir and the second sensing element is affixed to an interior of the reservoir.

4. The testing method as defined in claim 1 further comprising the step of generating the fluid flow stream from the third chamber through the fluid passageway and into the plunger chamber when the plunger moves from the second extended position back towards the first retracted position.

5. The testing method as defined in claim 3 wherein the control unit communicates with a graphical user interface to display a status message.

6. The testing method as defined in claim 3 wherein the first sensing element is a magnet.

7. The testing method as defined in claim 6 wherein the second sensing element is a 3D hall-sensor and/or a reed switch.

8. The testing method as defined in claim 1, wherein the guiding chamber is directly connected to and in direct fluid communication with the fluid passageway.

9. A testing method comprising the steps of:
providing a fluid reservoir having first, second and third chambers, the third chamber being formed by a main chamber and a guiding chamber in fluid communication with the main chamber;
providing and maintaining a first sensing element in the guiding chamber;
providing a plunger within an integrated brake controller at a first retracted position and switching a first plurality of solenoid valves into a closed position while a second plurality of solenoid valves are switched to an open position to create a first open flow path from a plunger chamber to the fluid reservoir;
moving the plunger from the first retracted position to a second extended position thereby exhausting fluid from the plunger chamber into the fluid reservoir via the first open flow path so as to move the first sensing element higher relative to a second sensing element fixed to the fluid reservoir; and
moving the plunger from the second extended position back towards the first retracted position thereby generating a negative pressure in a fluid passageway which connects the third chamber of the reservoir to the plunger chamber so that a fluid stream flows from the third chamber into the plunger chamber via the fluid passageway, the fluid stream directly drawing the first sensing element vertically downward within the guiding chamber toward the fluid passageway such that the first sensing element moves vertically downward in the guiding chamber relative to an upper surface of the fluid in the guiding chamber, the first sensing element moving vertically from an upper position to a lower position relative to the second sensing element as the first sensing element is drawn vertically downward; and
generating a signal from the first and second sensing elements and transmitting the signal to a control unit.

10. The testing method as defined in claim 9 wherein the plunger, the plunger chamber and solenoids are disposed within the integrated brake controller.

11. The testing method as defined in claim 10 wherein the first sensing element is a magnet.

12. The testing method as defined in claim 11 further comprising the step of transmitting a second signal from the control unit to a graphical user interface to display a message.

13. The testing method as defined in claim 9 wherein the guiding chamber is directly connected to and in direct fluid communication with the fluid passageway.

14. The testing method as defined in claim 9 wherein a vertical position of the first sensing element in the guiding chamber is independent of the upper surface of the fluid in the guiding chamber.

15. A testing method comprising the steps of:
providing a fluid reservoir including a guiding section and a projection extending from an inner surface of the fluid reservoir to a terminal end face;
providing a float having a first sensing element in the guiding section, the float having an engagement surface facing upward toward the terminal end face of the projection, the engagement surface directly contacting the terminal end face when a fluid level in the fluid reservoir is at a predetermined fluid level to maintain the float in the guiding section;
providing a negative pressure generator;
generating a negative pressure in a fluid passageway and a chamber which are in fluid communication with the guiding section wherein a second sensing element is affixed to the guiding section;
transferring a fluid flow stream generated via the negative pressure from the guiding section to the chamber via the fluid passageway, the fluid flow stream drawing the float having the first sensing element downward within the guiding chamber toward the fluid passageway so as to move the float having the first sensing element from an upper position to a lower position within the guiding section;
generating a signal via the first and second sensing elements as the float moves relative to the second sensing element within the guiding section; and
transmitting the signal to at least one of a control unit or a graphical user display.

16. The testing method as defined in claim 15 wherein the negative pressure generator is a pump.

17. The testing method as defined in claim 16 wherein the chamber is a chamber within the pump.

18. The testing method as defined in claim 15 wherein the guiding section is directly connected to and in direct fluid communication with the fluid passageway.

19. The testing method as defined in claim 15 wherein the fluid flow stream directly draws the float having the first sensing element downward within the guiding chamber toward the fluid passageway.

\* \* \* \* \*